United States Patent
Parry

(10) Patent No.: US 7,102,778 B2
(45) Date of Patent: Sep. 5, 2006

(54) PRINTER SELECTION SYSTEM AND METHOD WITH PRINT REQUEST DISTRIBUTION

(75) Inventor: Travis Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 10/044,406

(22) Filed: Jan. 11, 2002

(65) Prior Publication Data
US 2003/0133146 A1 Jul. 17, 2003

(51) Int. Cl.
*G06F 15/00* (2006.01)
(52) U.S. Cl. .......................... 358/1.15; 358/1.1
(58) Field of Classification Search ............... 358/1.1, 358/1.9, 1.13, 1.15, 448
See application file for complete search history.

(56) References Cited

U.S. PATENT DOCUMENTS

| | | | | |
|---|---|---|---|---|
| 5,467,434 A | | 11/1995 | Hower, Jr. et al. | ........ 358/1.15 |
| 5,625,757 A | * | 4/1997 | Kageyama et al. | ........ 358/1.14 |
| 5,978,560 A | * | 11/1999 | Tan et al. | ........ 358/1.15 |
| 5,995,722 A | * | 11/1999 | Kishida | ........ 358/1.15 |
| 6,498,656 B1 | * | 12/2002 | Mastie et al. | ........ 358/1.15 |
| 6,529,286 B1 | * | 3/2003 | King | ........ 358/1.14 |
| 6,762,852 B1 | * | 7/2004 | Fischer | ........ 358/1.15 |

* cited by examiner

*Primary Examiner*—Gabriel Garcia

(57) ABSTRACT

A system and method of selecting a printer from a plurality of printers to fulfill a print job of a user includes receiving a print request for the print job from the user at one of the printers, distributing the print request for the print job to at least another of the printers associated with the one of the printers, determining if the at least another of the printers has a printing capability to fulfill the print job, including comparing the print request for the print job with the printing capability of the at least another of the printers, and submitting a print offer to the user from the at least another of the printers if the at least another of the printers has the printing capability to fulfill the print job.

29 Claims, 11 Drawing Sheets

| | | | |
|---|---|---|---|
| NUMBER OF COPIES: _381_ | 10 | COLOR PRINTING OPTION: _386_ | ○ COLOR<br>○ GRAYSCALE<br>● MONOCHROME |
| PRINT MEDIUM SIZE: _382_ | LETTER<br>LEGAL<br>A4<br>⋮ | FINISHING OPTION: _387_ | ○ NONE<br>○ 3-HOLE PUNCH<br>● STAPLED<br>○ BOUND<br>○ FOLD<br>○ COVER<br>⋮ |
| PRINT MEDIUM TYPE: _383_ | PLAIN<br>BOND<br>TRANSPARENCY<br>⋮ | PRINTER LOCATION: _388_ | LOC1<br>LOC2<br>LOC3<br>⋮ |
| PRINTING QUALITY OPTION: _384_ | ● BEST<br>○ FASTER<br>○ CUSTOM | PRINTING PRIORITY: _389_ | ● IMMEDIATE<br>○ 1-2 HOURS<br>○ 2-4 HOURS |
| PRINTING LAYOUT: _385_ | ● PORTRAIT<br>○ LANDSCAPE<br>○ SINGLE SIDED<br>● TWO SIDED | ARCHIVE: _390_<br><br>PRICE: _391_ | ○ YES<br>● NO<br><br>● RANGE: ☐<br>○ MAX: ☐ |

USER INTERFACE

*Fig. 5*

PRINTER SELECTION SYSTEM AND METHOD WITH PRINT REQUEST DISTRIBUTION

CROSS-REFERENCE TO RELATED APPLICATIONS

This patent application is related to Non-Provisional U.S. patent application Ser. No. 09/873,653, entitled "PRINTER SELECTION SYSTEM AND METHOD", filed on Jun. 4, 2001, assigned to the assignee of the present invention, and incorporated herein by reference.

THE FIELD OF THE INVENTION

The present invention relates generally to print services, and more particularly to a system and method of selecting a printer from a plurality of printers to fulfill a print job, including distributing a print request for the print job among associated printers.

BACKGROUND OF THE INVENTION

Typically, a user having a print job has at their disposal one or more printers for printing of the print job. To assess a capability of the printers to fulfill the print job, such as options and/or properties of the printers, however, the user must select a single printer and then explore the capability of that printer. Thus, the user may need to select each available printer and assess or explore the capabilities of each available printer individually to determine which printer has the printing capability to fulfill the print job.

Unfortunately, individually assessing or exploring all of the capabilities of all of the available printers is a tedious task. In addition, a user may not be aware of all of the available printers and, therefore, all of the available printing capabilities. The user, therefore, may be blindly selecting a printer for printing of the print job even though a printer more suitable for the print job is available.

Accordingly, a need exists for selecting a printer from a plurality of printers to fulfill a print job of a user. More particularly, a need exists for identifying or detecting for the user which of the plurality of printers have the capability to fulfill the print job.

SUMMARY OF THE INVENTION

One aspect of the present invention provides a method of selecting a printer from a plurality of printers to fulfill a print job of a user. The method includes receiving a print request for the print job from the user at one of the printers, distributing the print request for the print job to at least another of the printers associated with the one of the printers, determining if the at least another of the printers has a printing capability to fulfill the print job, including comparing the print request for the print job with the printing capability of the at least another of the printers, and submitting a print offer to the user from the at least another of the printers if the at least another of the printers has the printing capability to fulfill the print job.

Another aspect of the present invention provides a system for selecting a printer from a plurality of printers to fulfill a print job of a user. The system includes a first controller associated with a first printer of the plurality of printers and adapted to receive a print request for the print job from the user and distribute the print request for the print job to at least a second printer of the plurality of printers which is associated with the first printer. In addition, the system includes a second controller associated with the second printer of the plurality of printers and adapted to receive the print request for the print job from the first printer and compare the print request for the print job with a printing capability of the second printer to determine if the second printer has the printing capability to fulfill the print job. As such, the second controller is adapted to submit a print offer to the user if the second printer has the printing capability to fulfill the print job.

BRIEF DESCRIPTION OF THE DRAWINGS

FIG. 5 is a diagram illustrating one exemplary embodiment of a portion of a user interface of the printer selection system of FIG. 1.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
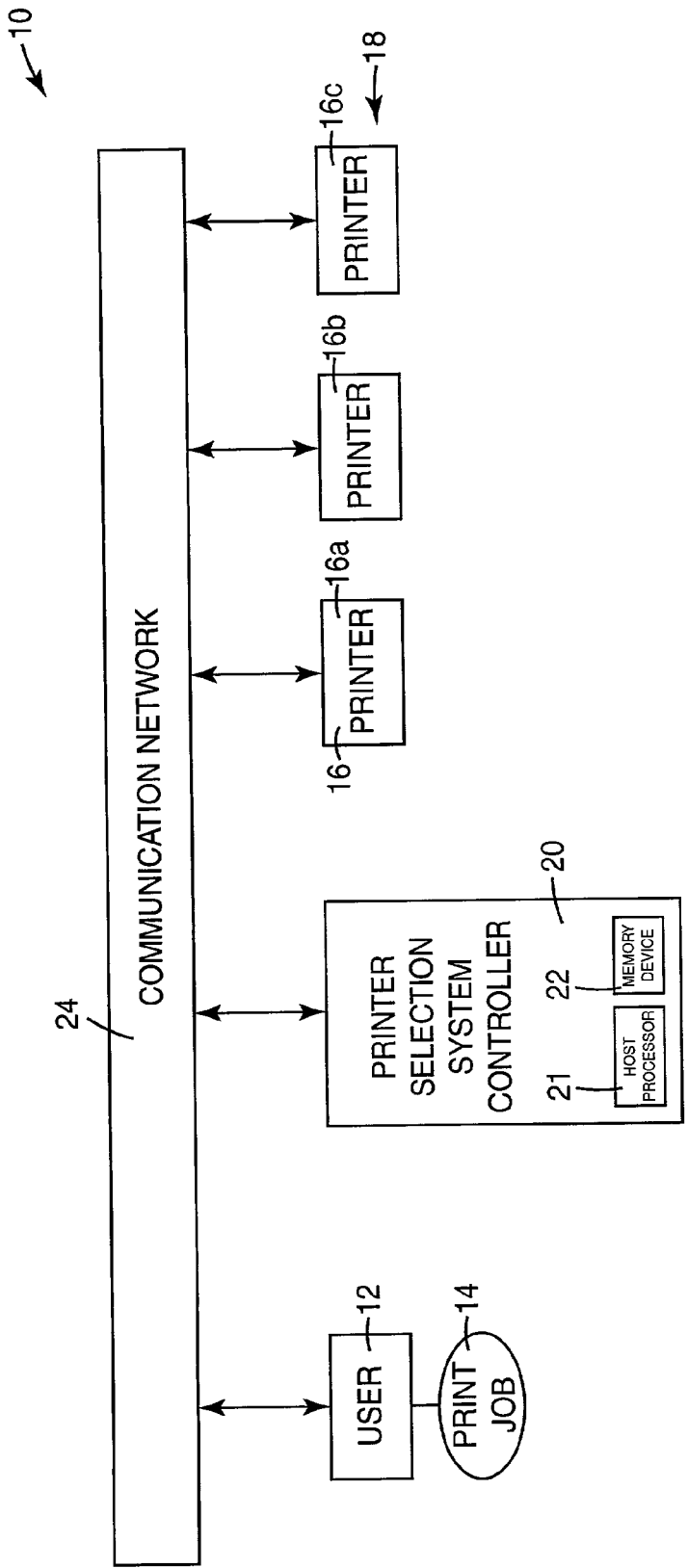
FIG. 1 is a block diagram illustrating one exemplary embodiment of a printer selection system according to the present invention.

A printer selection system according to the present invention is illustrated generally at 10 in FIG. 1. Printer selection system 10 assists a user 12 having a print job 14 in selecting a printer 16*a*, 16*b*, 16*c* for print job 14. For clarity, printer 16a, 16b, 16c is referred to hereinafter as printer 16. As such, printer 16 is one of a plurality of printers 18 registered with printer selection system 10.

Printer 16, as used herein, is defined to include a printing device capable of producing printed output, including textural and/or graphical images, on a print medium, such as paper, in response to electronic signals. Examples of such a printing device include a laser jet printer, an inkjet printer, etc.

Printer selection system 10 includes a printer selection system controller 20 which determines which printer 16 of the plurality of printers 18 is capable of fulfilling print job 14. Printer selection system controller 20 includes hardware, software, firmware, or a combination of these. In one preferred embodiment, printer selection system controller 20 includes a host processor 21. Host processor 21 can be or can be included in a computer server or other microprocessor-based system capable of performing a sequence of logic operations. In addition, printer selection system controller 20 can include a microprocessor embedded system/appliance incorporating tailored appliance hardware and/or dedicated single purpose hardware.

In one exemplary embodiment, printer selection system controller 20 includes a memory device 22 which stores information for printer selection system controller 20 and/or printer selection system 10. Examples of memory device 22 include non-volatile memory (e.g., a hard disk drive or other persistent storage device) and may include volatile memory (e.g., random access memory (RAM)). Another example of memory device 22 may include a relational database management server (RDBMS). While memory device 22 is presented as part of printer selection system controller 20, it is within the scope of the present invention for memory device 22 to be separate from printer selection system controller 20.

User 12, printers 18, and printer selection system controller 20 communicate with each other via a communication network 24. Thus, communications between user 12 and printer selection system controller 20, communicates between printers 18 and printer selection system controller 20, and communications between user 12 and printers 18 are conducted over communication network 24. Communication network 24, as used herein, is defined to include a local-area network (LAN) and/or a wide-area network (WAN). Communication network 24, therefore, may include an intranet communication network, an Internet communication network, or a similar high-speed communication network including a wireless communication network.

In one exemplary embodiment, user 12, printers 18, and printer selection system controller 20 are all located remote from each other (i.e., at different locations). Thus, communications between user 12, printers 18, and printer selection system controller 20 are conducted over communication network 24. It is, however, within the scope of the present invention for user 12 and printer selection system controller 20, printers 18 and printer selection system controller 20, and/or user 12 and printers 18 to be located at the same location. Thus, user 12, printers 18, and/or printer selection system controller 20 may communicate in other manners (e.g., a direct connection or communication link).

Components of printer selection system 10, including printer selection system controller 20, can be implemented in hardware via a microprocessor, programmable logic device, or state machine, in firmware, or in software within a given device. In one exemplary embodiment, at least a portion of the software programming is written in JAVA programming language, and each of the main components communicate via communication network 24 using a communication bus protocol. For example, the present invention may or may not use a TCP/IP protocol suite for data transport. Other programming languages and communication bus protocols suitable for use with printer selection system 10 will become apparent to those skilled in the art after reading the present application.

Figure 2:
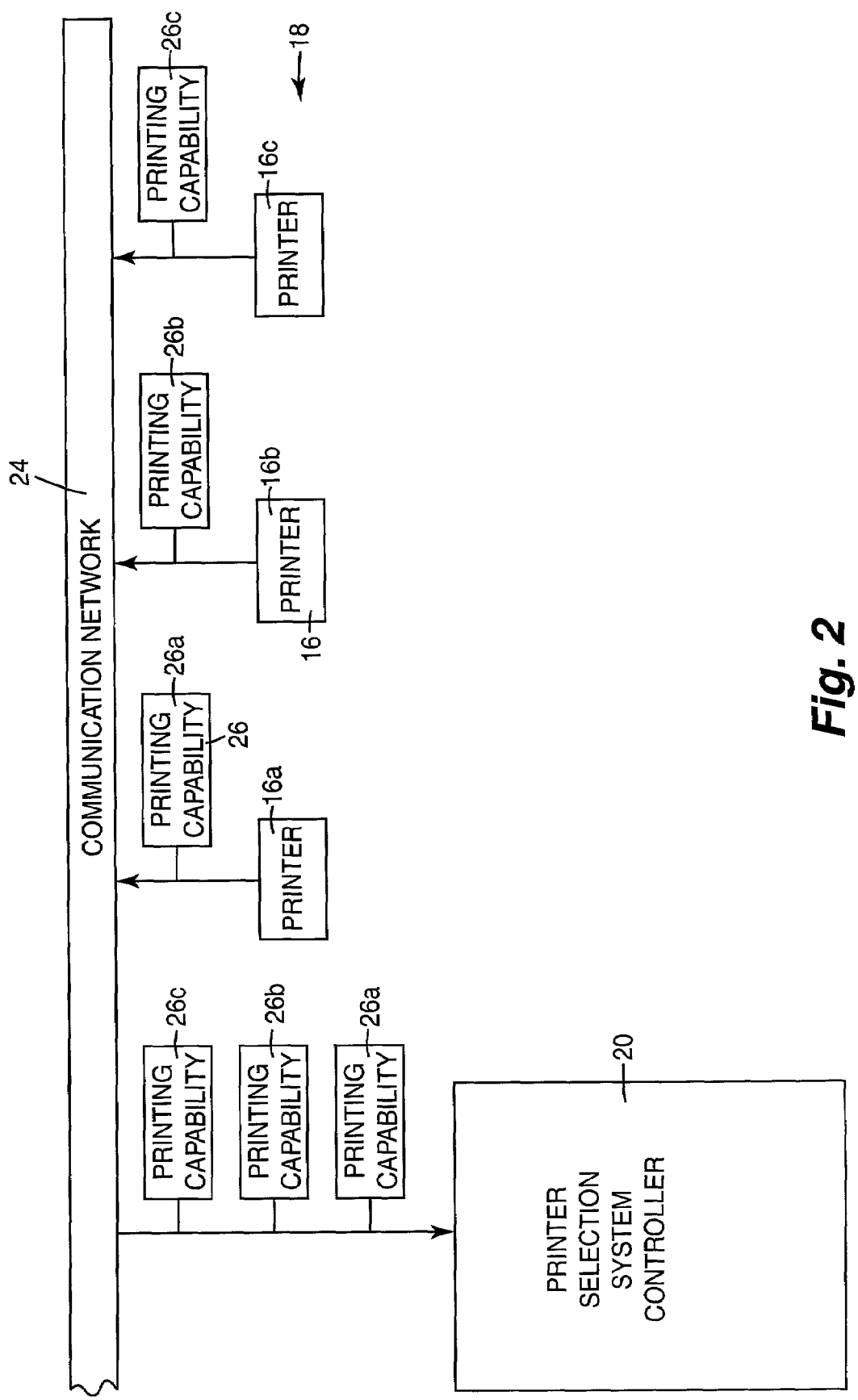
FIG. 2 is a block diagram illustrating one exemplary embodiment of information flow through a portion of the printer selection system of FIG. 1.

As illustrated in FIG. 2, a printing capability 26a, 26b, 26c of each respective printer 16a, 16b, 16c is registered with printer selection system controller 20 via communication network 24. For clarity, printing capability 26a, 26b, 26c is referred to hereinafter as printing capability 26. Printing capability 26 identifies attributes of a respective printer 16, as described below.

In one exemplary embodiment, printer selection system controller 20 communicates with and transfers printing capability 26 of printers 18 to memory device 22 (FIG. 1). As such, memory device 22 stores printing capability 26 of printers 18 for subsequent retrieval and processing. More specifically, when printer selection system controller 20 receives printing capability 26 from a respective printer 16, printing capability 26 is stored as a data file in memory device 22. Printer selection system controller 20, therefore, subsequently retrieves printing capability 26 from memory device 22 for processing.

In one exemplary embodiment, printer selection system 10 utilizes a network management protocol to register printing capability 26 of printers 18 with printer selection system controller 20. An example of a network management protocol suitable for use with printer selection system 10 includes a simple network management protocol (SNMP). As SNMP-compliant devices, printers 18 store data about themselves, including, for example, printing capability 26, and return this data to printer selection system controller 20, as an SNMP requester, when requested by printer selection system controller 20. Another example of a network management protocol suitable for use with printer selection system 10 includes a remote monitoring (RMON) network management protocol.

Figure 3:
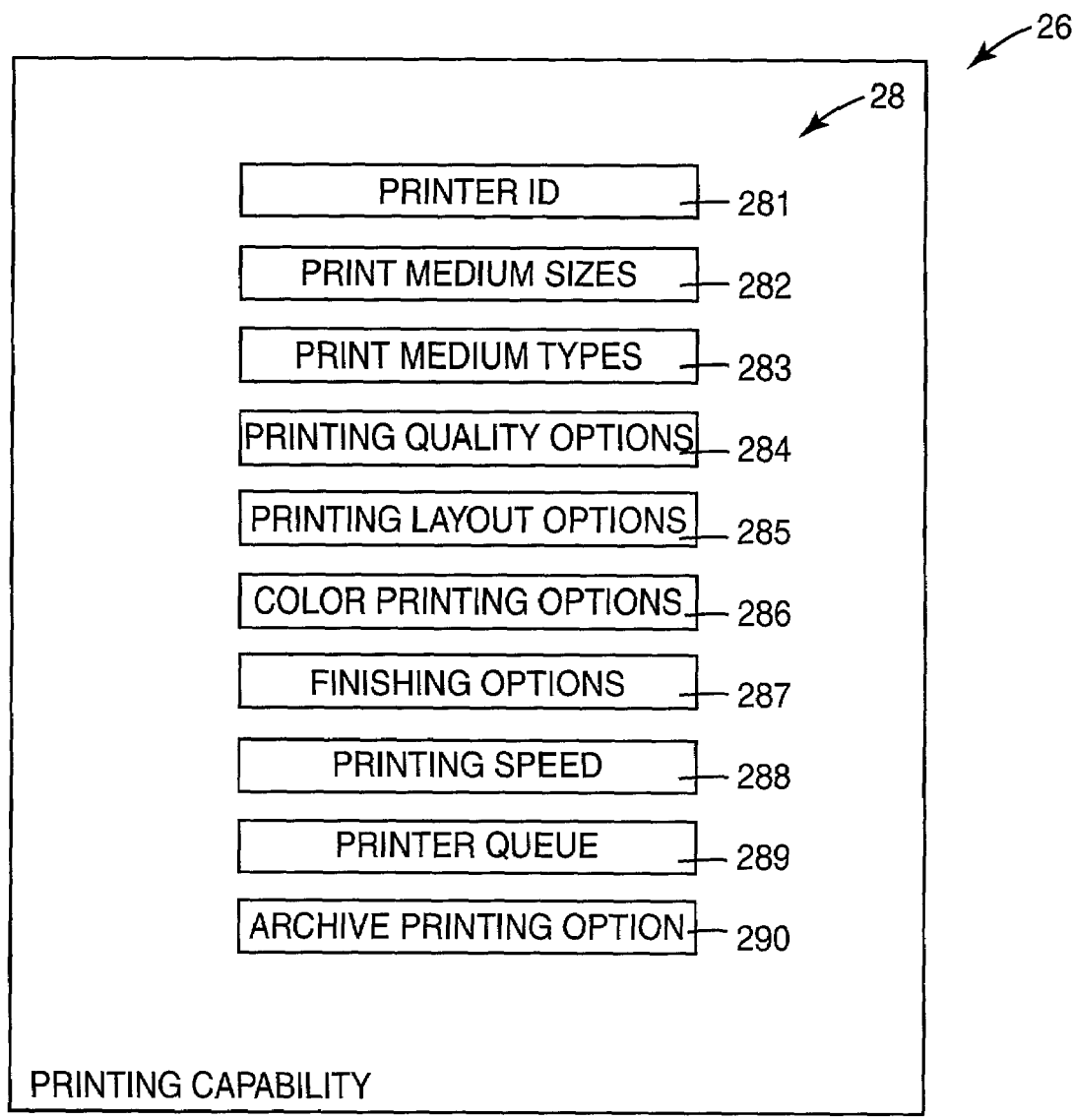
FIG. 3 is a diagram illustrating one exemplary embodiment of a printing capability of a printer registered with the printer selection system of FIG. 1.

In one exemplary embodiment, as illustrated in FIG. 3, printing capability 26 includes a plurality of printing capability attributes 28 which define characteristics of each respective printer 16. Printing capability attributes 28 include, for example, a printer identification attribute 281, a print medium sizes attribute 282, a print medium types 283, a printing quality options attribute 284, a printing layout options attribute 285, a color printing options attribute 286, a finishing options attribute 287, a printing speed attribute 288, a printer queue attribute 289, and an archival printing option attribute 290.

Printer identification attribute 281 identifies, for example, a name and a location of printer 16, including a proximity of printer 16 to user 12. Print medium sizes attribute 282 identifies different sizes of print medium upon which printer 16 is capable of printing. Examples of different print medium sizes include a Letter-size, a Legal-size, and an A4-size of print medium. Print medium types attribute 283 identifies different types of print medium upon which printer 16 is capable of printing. Examples of different print medium types include Plain Paper, Bond Paper, and Transparencies.

Printing quality options attribute 284 identifies different printing qualities that printer 16 is capable of printing. An example of printing quality includes different printing resolutions such as 1200 dpi, 600 dpi, 300 dpi, etc. Printing layout options attribute 285 identifies different printing layouts that printer 16 is capable of printing. Examples of different printing layout options include Portrait and Landscape and Single-Sided and Double-Sided. Color printing options attribute 286 identifies different color printing options that printer 16 is capable of printing. Examples of different color printing options include Color Printing, Grayscale Printing, and Monochrome Printing.

Finishing options attribute 287 identifies different finishing options that printer 16 is capable of providing. Examples of different finishing options include Three-Hole Punched, Stapled, and Bound. Printing speed attribute 288 identifies a printing speed of printer 16. Examples of different printing speeds include, for example, 17 pages per minute, 24 pages per minute, and 32 pages per minute. Printer queue attribute 289 identifies, for example, a wait time for printing at printer 16 and an order of printing at printer 16. Archival printing option attribute 290 identifies an archive function of printer 16 such as an ability of printer 16 to retain print job 14 for subsequent printing.

It is understood that additional print medium sizes, print medium types, printing quality options, printing layout options, color printing options, finishing options, and printing speeds, as are well known in the art, may be identified with print medium sizes attribute 282, print medium types attribute 283, printing quality options attribute 284, printing layout options attribute 285, color printing options attribute 286, finishing options attribute 287, and printing speed attribute 288, respectively.

Figure 4:
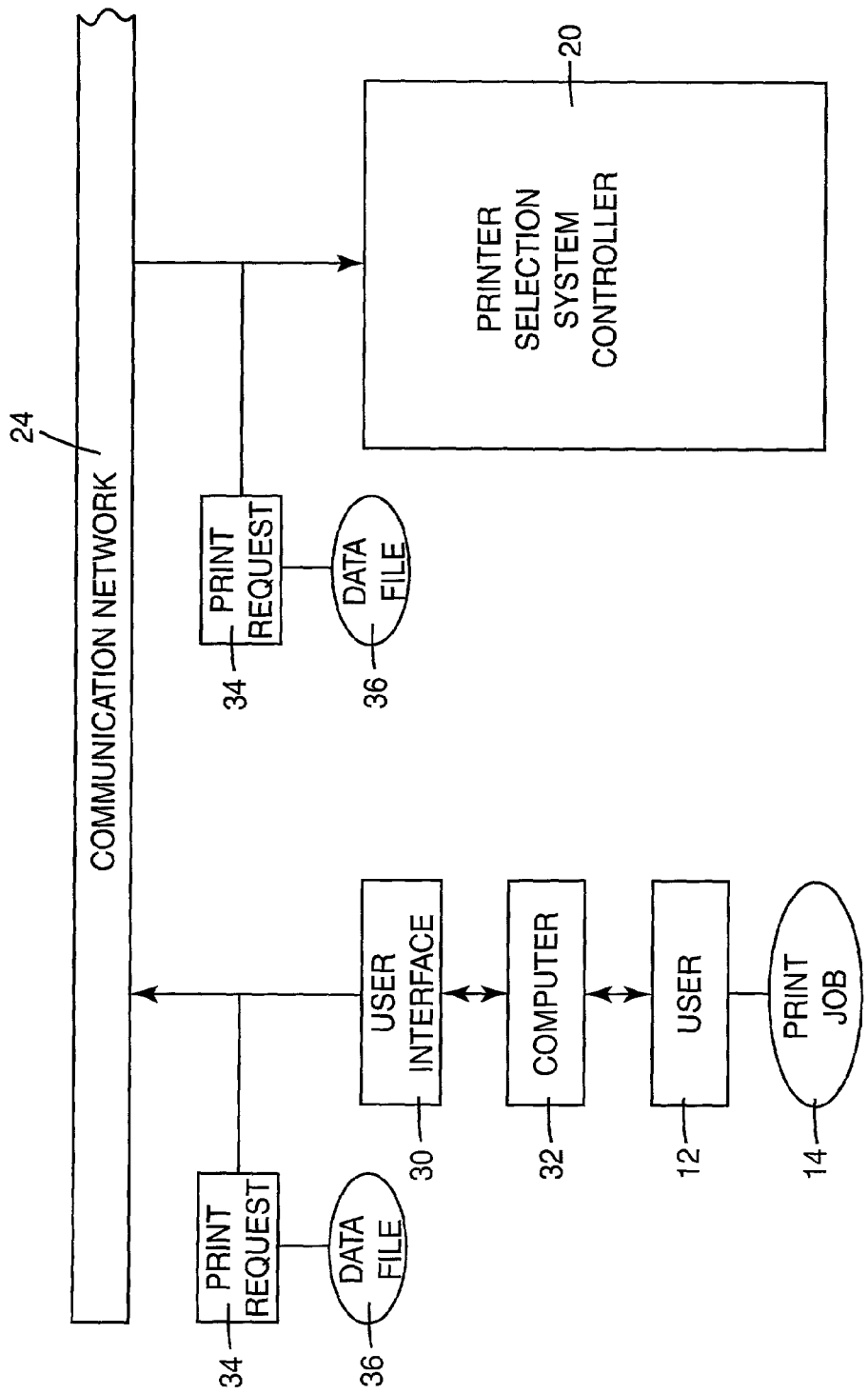
FIG. 4 is a block diagram illustrating one exemplary embodiment of information flow through a portion of the printer selection system of FIG. 1.

As illustrated in FIG. 4, user 12 accesses a user interface 30 of printer selection system 10 via a computer 32. Computer 32 may include, for example, an input device such as a keyboard and/or a mouse and a display device such as a monitor, as is well known in the art. Computer 32 may be an appliance such as a personal digital assistant (PDA), scanner, camera, cellular phone, etc. Computer 30 may also be included in printer 16 or other imaging device. As such, user 12 accesses user interface 30 from, for example, a control panel of printer 16.

It is within the scope of the present invention for printer selection system 10 to be incorporated into computer 32 and, therefore, printer selection system controller 20 to be a component of computer 32. It is also within the scope of the present invention for multiple users 12 to utilize printer selection system 10. Thus, one or more users 12, each having a respective print job 14, may access printer selection system 10 from a respective computer 32.

In one exemplary embodiment, computer 32 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system.

User 12 interacts with user interface 30 via computer 32 to generate a print request 34 for print job 14 and submit print request 34 for print job 14 to printer selection system controller 20 via communication network 24. Print request 34 identifies attributes of print job 14 as specified by user 12. Print request 34, as used herein, is defined to include a list and/or a description of a piece of work requiring production and/or reproduction of printed matter.

In one exemplary embodiment, a data file 36 for print job 14 is associated with print request 34. As such, data file 36 is submitted with print request 34 and uploaded to printer selection system controller 20 via communication network 24.

In one exemplary embodiment, as illustrated in FIG. 5, a portion of user interface 30 includes a plurality of input fields 38 with which user 12 interacts to specify attributes of print job 14. As such, user 12 interacts with input fields 38 directly or via an input device such as a keyboard and/or a mouse of computer 32 or an appliance such as a personal digital assistant (PDA), scanner, camera, etc., to generate print request 34 for print job 14.

Input fields 38 include, for example, a number of copies field 381, a print medium size field 382, a print medium type field 383, a printing quality option field 384, a printing layout field 385, a color printing option field 386, a finishing option field 387, a printer location field 388, a printing priority field 389, an archive option field 390, and a price field 391. Input fields 38 each include at least one subfield providing data entry points or representing available options for generating and submitting print request 34.

Number of copies field 381 includes a subfield in which a number of copies included in print job 14 is specified. Print medium size field 382 includes subfields which represent different sizes of print medium for print job 14. Print medium type field 383 includes subfields which represent types of print medium for print job 14. Printing quality option field 384 includes subfields which represent different printing qualities, including different printing positions such as 1200 dpi, 600 dpi, 300 dpi, etc., for print job 14. Printing layout field 385 includes subfields which represent different printing layouts for print job 14. Color printing option field 386 includes subfields which represent different color printing options for print job 14. Finishing option field 387 includes subfields which represent different finishing options for print job 14. Printer location field 388 includes subfields which represent different locations of printers for print job 14. Printing priority field 389 includes subfields which represent different priorities of printing print job 14. Archive option field 390 includes subfields for specifying archival of print job 14. Price field 391 includes subfields for specifying a price, such as a price range and/or maximum price, that user 12 is willing to pay for print job 14 to be processed.

Additional print medium sizes, print medium types, printing quality options, printing layouts, color printing options, and finishing options, as are well known in the art, may be represented by additional subfields of print medium size field 382, print medium type field 383, printing quality option field 384, printing layout field 385, color printing option field 386, and finishing option field 387, respectively.

Selecting and/or completing various subfields of input fields 38, therefore, identifies attributes of print job 14 as specified by user 12. In one exemplary embodiment, input of specific input fields 38 dictates a selection of other input fields 38. When user 12 selects a specific subfield, for example, additional subfields may appear and/or existing subfields may be unavailable. In addition, when user 12 selects a specific subfield, additional subfields may be automatically selected and/or completed. Furthermore, user 12 may store preferences of various subfields as common default selections.

It is to be understood that FIG. 5 is a simplified illustration of one exemplary embodiment of user interface 30. The illustrative presentation of input fields 38, including the respective subfields, has been simplified for clarity of the invention. The subfields, for example, may be presented as open fields, pull-down menus, toggle selections, and/or highlighted or framed selections. In addition, user interface 30 may be presented, for example, in one or more screens or views such that each screen or view includes one or more input fields 38. Furthermore, user 12 may generate print request 34 by responding to query-based systems or applications. It is understood that such alternatives are within the scope of the present invention.

Figure 6:
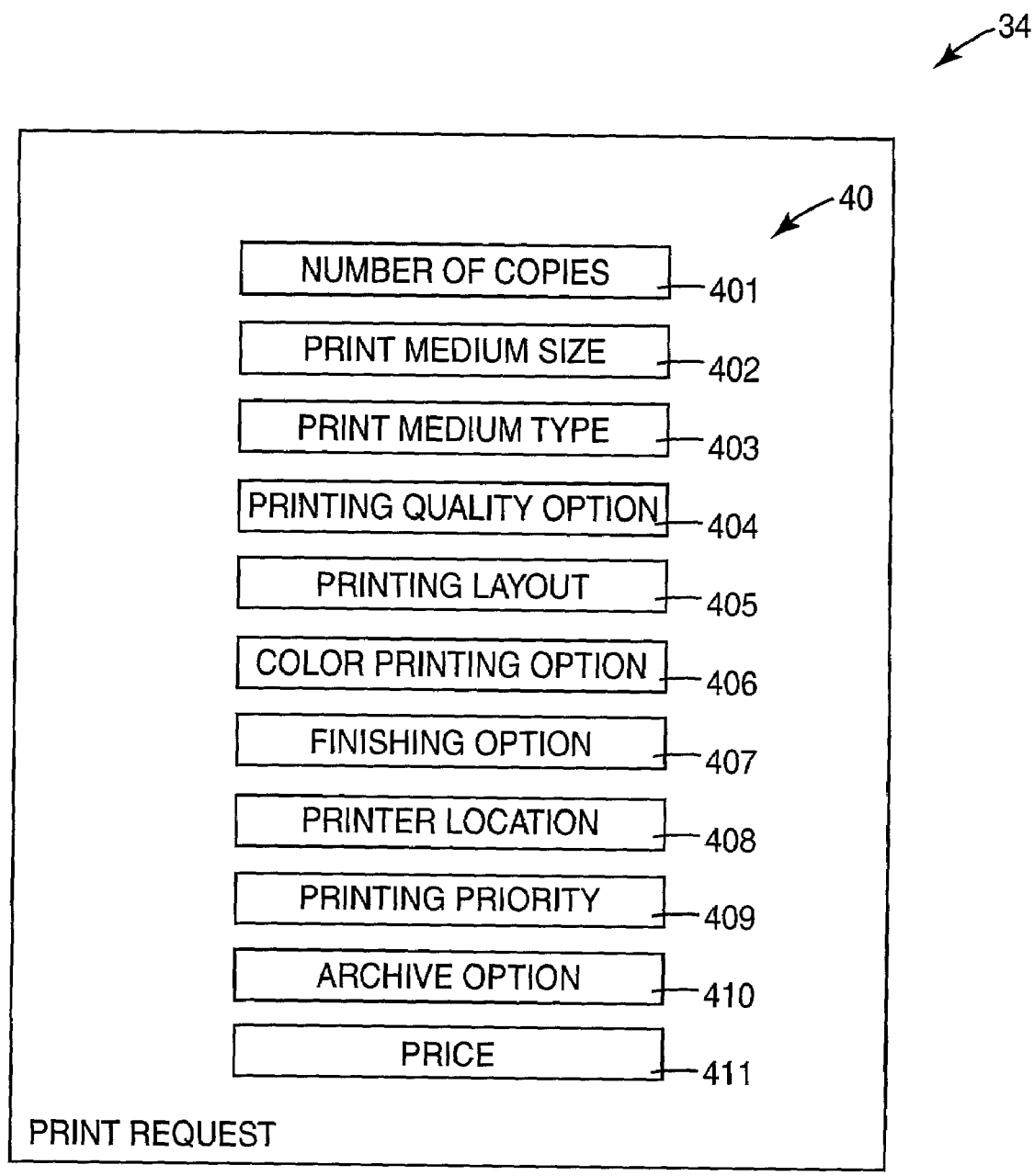
FIG. 6 is a diagram illustrating one exemplary embodiment of a print request for a print job received by the printer selection system of FIG. 1.

By interacting with user interface 30, user 12 generates print request 34. In one exemplary embodiment, as illustrated in FIG. 6, print request 34 includes a plurality of print request attributes 40 which define print job 14. Print request attributes 40 coincide with selections as specified by user 12 while interacting with user interface 30. As such, print request attributes 40 are conveyed to printer selection system controller 20 from user interface 30. Print request attributes 40 include, for example, a number of copies attribute 401, a print medium size attribute 402, a print medium type 403, a printing quality option attribute 404, a printing layout attribute 405, a color printing option attribute 406, a finishing option attribute 407, a printer location attribute 408, a printing priority attribute 409, an archive option attribute 410, and a price attribute 411.

Number of copies attribute 401 includes a number of copies included in print job 14. Print medium size attribute 402 includes a selected or desired size of print medium upon which print job 14 is to be printed. Print medium type attribute 403 includes a selected or desired type of print medium upon which print job 14 is to be printed. Printing quality option attribute 404 includes a selected or desired printing quality for print job 14. Printing layout attribute 405 includes a selected or desired layout of how print job 14 is to be printed. Color printing option attribute 406 includes a selected or desired color content for print job 14. Finishing option attribute 407 includes a selected or desired finish for print job 14. Printer location attribute 408 includes a selected or desired location of a printer for printing of print job 14. Printing priority attribute 409 includes a selected or desired priority for completion of print job 14. Archive attribute 410 includes a selected or desired storage and/or subsequent printing of print job 14. Price attribute 411 includes a price, such as a price range and/or maximum price, that user 12 is willing to pay for print job 14 to be processed.

To assist user 12 in selecting printer 16 for printing print job 14, printer selection system controller 20 determines which printers 18 have printing capability 26 to fulfill print job 14. As such, printer selection system controller 20 compares print request 34 for print job 14 with printing capability 26 of printers 18.

It is understood that print request attributes 40 of print request 34 may be conveyed individually to printer selection system controller 20 as print request attributes 40 are selected or specified. Thus, printer selection system controller 20 identifies which printers 18 fulfill print request 34 and, therefore, print job 14, as print request attributes 40 are received. Which printers 18 fulfill print request 34, therefore, may be limited and/or narrowed as additional print request attributes 40 are received.

In one exemplary embodiment, printer selection system controller 20 determines a number of pages of print job 14 from data file 36. As such, printer selection system controller 20 selects printer 16 based on the number of pages of print job 14. If, for example, the number of pages of print job 14 is greater than a predetermined number, then printer selection system controller 20 identifies which printers 18 can print print job 14 the fastest based on printing speed attribute 288 and/or which printers 18 can print print job 14 in duplex form based on printing layout options attribute 285.

Figure 7:
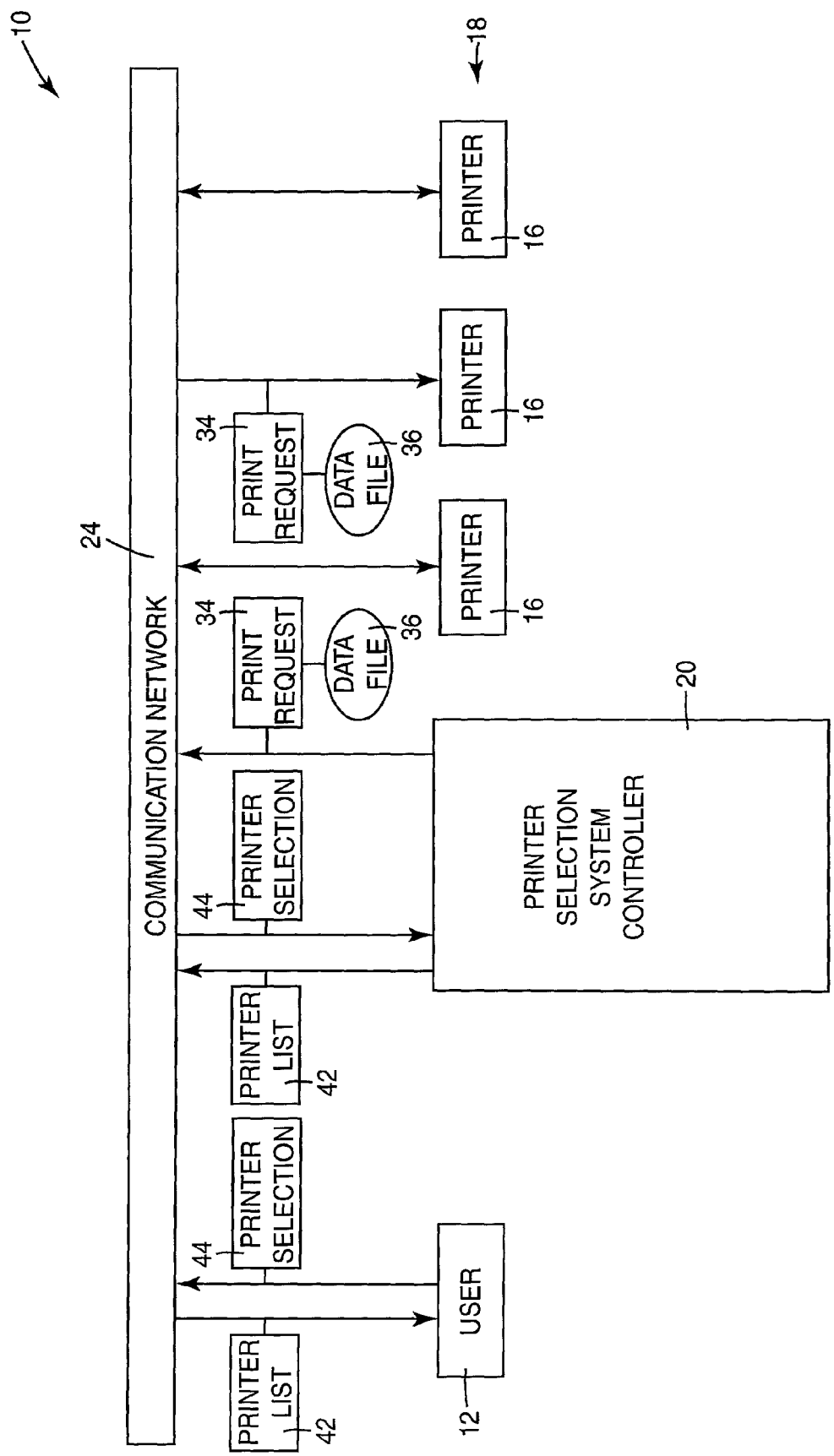
FIG. 7 is a block diagram illustrating one exemplary embodiment of information flow through the printer selection system of FIG. 1.

In one exemplary embodiment, as illustrated in FIG. 7, printer selection system controller 20 compiles a list 42 of printers 18 which have printing capability 26 to fulfill print job 14 and presents list 42 to user 12 via communication network 24. As such, user 12 selects at least one printer 16 from list 42 for printing of print job 14. In one exemplary embodiment, user 12 submits a printer selection 44 identifying the selected printer to printer selection system controller 20 via communication network 24. Thus, printer selection system controller 20 receives printer selection 44 and distributes print request 34 and data file 36 for print job 14 to the selected printer 16 via communication network 24. User 12, therefore, distributes print request 34 and data file 36 for print job 14 to the selected printer 16 through printer selection system controller 20. It is, however, within the scope of the present invention for user 12 to select at least one printer 16 from list 42 for printing of print job 14 and distribute print request 34 and data file 36 for print job 14 directly to the selected printer 16.

Figure 8:
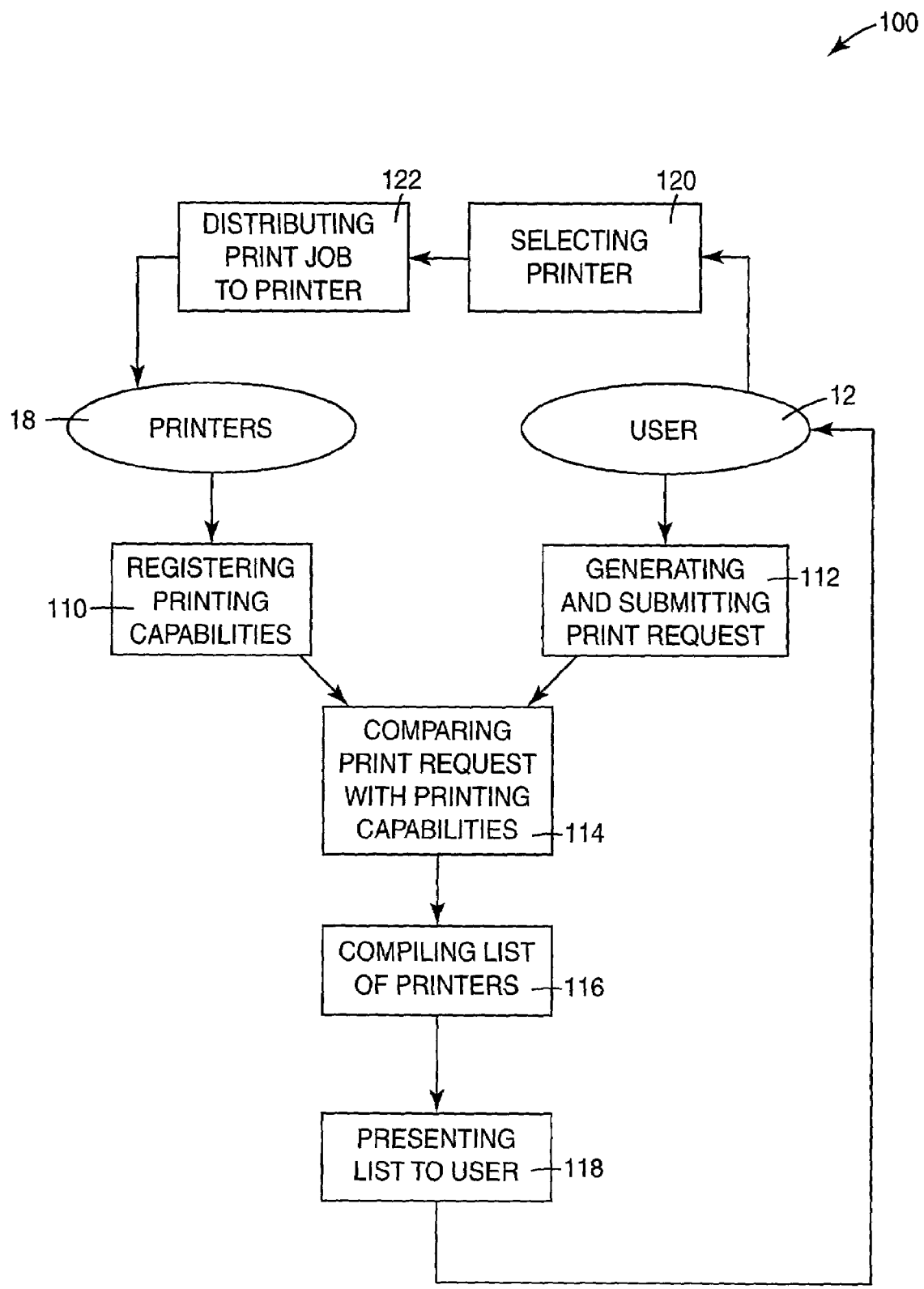
FIG. 8 is a flow diagram illustrating one exemplary embodiment of a method of selecting a printer from a plurality of printers for a print job according to the present invention.

In FIG. 8, a flow diagram illustrating one exemplary embodiment of a method of selecting a printer 16 from a plurality of printers 18 to fulfill print job 14 according to the present invention is illustrated generally at 100. Reference is also made to FIGS. 1–7. At step 110, a respective printing capability 26 of printers 18 is registered with printer selection system controller 20 and, at step 112, user 12 generates and submits print request 34 for print job 14 to printer selection system controller 20. In one exemplary embodiment, printing capability 26 of printers 18 is registered with printer selection system controller 20 via communication network 24, as illustrated in FIG. 2, and user 12 submits print request 34 to printer selection system controller 20 via communication network 24, as illustrated in FIG. 4.

Preferably, printing capability 26 of printers 18 is registered at step 110 before user 12 generates and submits print request 34 at step 112. It is, however, within the scope of the present invention for printing capability 26 of printers 18 to be registered with printer selection system controller 20 after user 12 submits print request 34 to printer selection system controller 20. As such, after printer selection system controller 20 receives print request 34, printer selection system controller 20 requests and receives printing capability 26 from printers 18. In addition, it is also within the scope of the present invention for printing capability 26 of printers 18 to be re-registered or updated with printer selection system controller 20. If, for example, printers 18 are added, deleted, and/or upgraded, printing capability 26 can be updated. Furthermore, it is also within the scope of the present invention for user 12 to re-generate and/or re-submit print request 34 to printer selection system controller 20.

Next, in step 114, after printer selection system controller 20 receives print request 34, printer selection system controller 20 determines which printers 18 have printing capability 26 to fulfill print job 14. As such, printer selection system controller 20 compares print request 34 for print job 14 with printing capability 26 of printers 18.

To compare print request 34 for print job 14 with printing capability 26 of printers 18, print request attributes 40 of print job 14, as specified by user 12, are compared with printing capability attributes 28 of printers 18, as registered with and/or received by printer selection system controller 20. Thus, printer selection system controller 20 determines which printers 18 have printing capability 26 to fulfill print request 34 and, therefore, complete print job 14. Accordingly, only those printers 18 which have printing capability 26 to fulfill print request 34 are identified in step 114.

Next, in step 116, list 42 of printers 18 which have printing capability 26 to fulfill print request 34, as established by printer selection system controller 20 in step 114, is compiled and, in step 118, is presented to user 12. In one exemplary embodiment, list 42 is presented to user 12 via communication network 24, as illustrated in FIG. 7.

Next, in step 120, user 12 selects at least one printer 16 from list 42 to complete print job 14. Thus, in one exemplary embodiment, user 12 submits printer selection 44 to printer selection system controller 20 via communication network 24, as illustrated in FIG. 7.

Then, in step 122, print request 34 and data file 36 for print job 14 are distributed to printer 16, as selected in step 120.

In one exemplary embodiment, steps 110–122 of method 100 are performed via computer-executable instructions of a computer-readable medium. Computer-readable medium, as used herein, is defined to include any kind of computer memory such as a floppy disk, conventional hard disk, CD-ROM, Flash ROM, nonvolatile ROM, RAM, etc.

By comparing print request 34 for print job 14 with printing capability 26 of printers 18, printer selection system 10 automatically determines which printers 18 have printing capability 26 to fulfill print job 14. Thus, when selecting a printer for print job 14, it is not necessary for user 12 to know which printer 16 has the capability to fulfill print job 14. As such, it is not necessary for user 12 to explore the capabilities of each printer to identify which printer can fulfill print job 14.

Print Request Distribution

Figure 9:
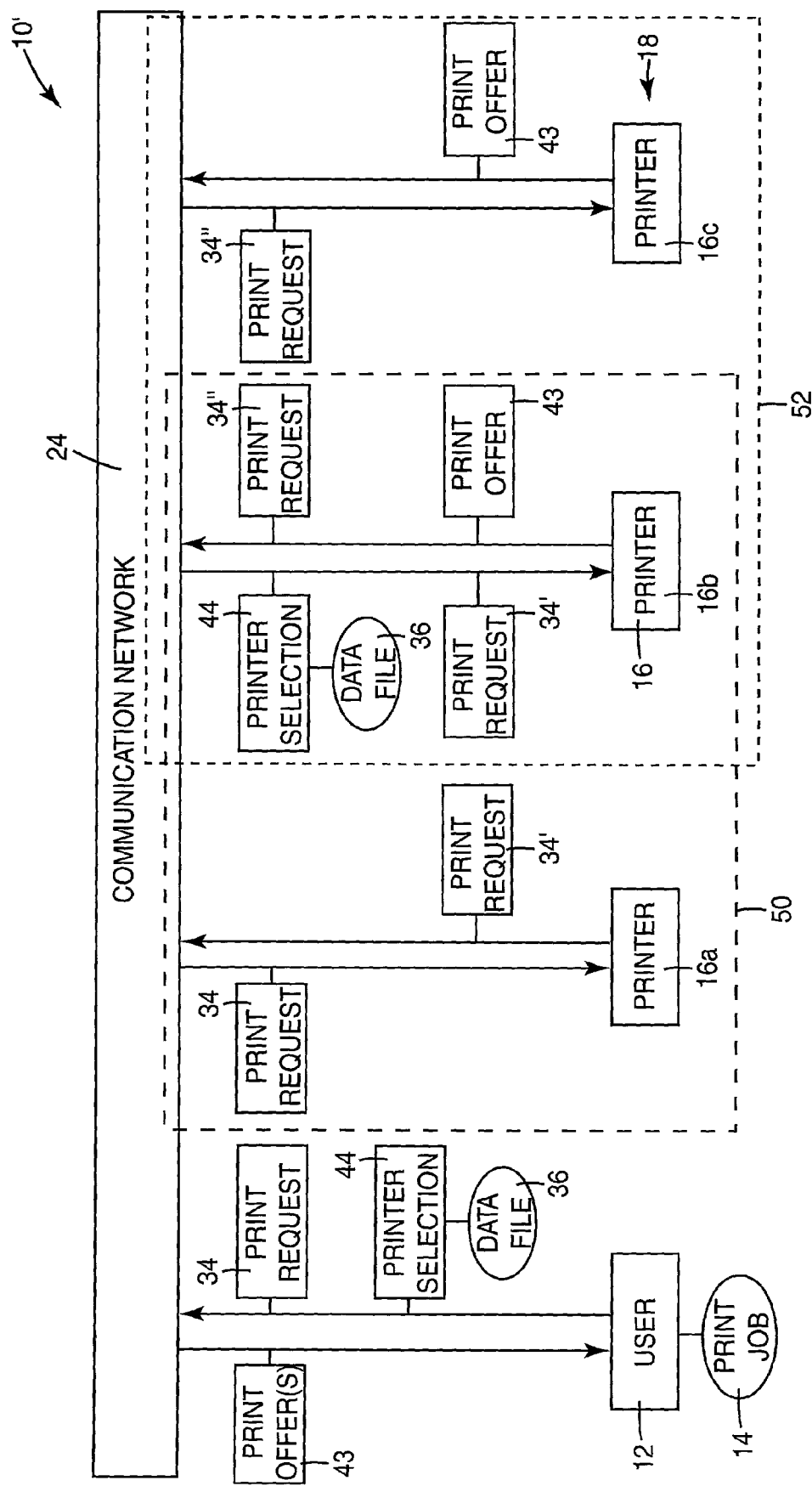
FIG. 9 is a block diagram illustrating another exemplary embodiment of a printer selection system according to the present invention.

FIG. 9 illustrates another exemplary embodiment of printer selection system 10. Printer selection system 10' assists user 12 having print job 14 in selecting at least one printer 16 for print job 14 from among printers 18. Similar to that with printer selection system 10, user 12 interacts with user interface 30 and generates print request 34 for print job 14, as illustrated and described above with reference to FIGS. 5 and 6. However, with printer selection system 10', user 12 submits print request 34 directly to printer 16 including, for example, printer 16a. Preferably, user 12 submits print request 34 to printer 16a via communication network 24.

In one exemplary embodiment, printer 16a represents, for example, a local printer of user 12 and, as such, may not have a printing capability to fulfill print job 14 as specified by user 12 with print request 34. Accordingly, printer 16a distributes print request 34, as print request 34', to another printer 16 including, for example, printer 16b.

Preferably, printer 16b is associated with printer 16a as represented, for example, by dashed line 50. More specifically, printers 16a and 16b have the ability to communicate with each other. Printers 16a and 16b, for example, may be provided at a common location, such as an office building or on a common floor of an office building. In addition, printers 16a and 16b may be located within a predetermined distance or proximity to user 12. In addition, printers 16a and 16b may be included in a common sub-network or network address range.

By being associated with printer 16a, printer 16a has the ability to distribute print request 34, as print request 34', to printer 16b. Preferably, printer 16a distributes print request 34' to printer 16b via communication network 24. It is, however, within the scope of the present invention for printers 16a and 16b to communicate in other manners (e.g., a direct connection or communication link.)

In one exemplary embodiment, printer 16b further distributes print request 34', as print request 34", to another printer including, for example, printer 16c. Preferably, printer 16c is associated with printer 16b as represented, for example, by dashed line 52. More specifically, printers 16b and 16c have the ability to communicate with each other as described above. Thus, by being associated with printer 16b, printer 16b has the ability to distribute print request 34', as print request 34", to printer 16c. Preferably, printer 16b distributes print request 34" to printer 16c via communication network 24. It is, however, within the scope of the present invention for printers 16b and 16c to communicate in other manners (e.g., a direct connection or communication link).

It is understood that each printer, for example, printer 16a, printer 16b, and/or printer 16c may be associated with one or more other printers. As such, printers 16a, 16b, and/or 16c may each distribute print request 34 to any number of printers communicating, for example, with communication network 24.

When printers 16b and 16c receive print requests 34' and 34", respectively, printers 16b and 16c each determine whether they have printing capability 26 to fulfill print job 14, as specified by print request 34. Printers 16b and 16c determine whether they have printing capability 26 to fulfill print job 14 by comparing, for example, print request attributes 40, as specified in print request 34, with printing capability attributes 28, as included in printing capability 26, as described above. Thus, if printer 16b and/or printer 16c has printing capability 26 to fulfill print job 14, printer 16b and/or printer 16c submits a print offer 43 to user 12. Preferably, printer 16b and/or printer 16c submits print offer 43 to user 12 via communication network 24. Print offer 43 may include or specify stipulations or conditions for completing print job 14, such as a price to complete print job 14.

In one exemplary embodiment, one or more print offers 43 for completing print job 14 are submitted to user 12. As such, user 12 accepts or selects at least one print offer 43, as submitted by at least one printer 16, to fulfill print job 14. With printer selection system 10', user 12 submits printer selection 44, identifying the selected printer 16 and, more specifically, selected print offer 43, directly to the selected printer, for example, printer 16b. Preferably, user 12 submits printer selection 44 directly to the selected printer via communication network 24. User 12 may specify that print offer 43 be automatically accepted or selected if, for example, print offer 43 satisfies certain criteria, such as price.

In one exemplary embodiment, user 12 associates data file 36 for print job 14 with printer selection 44 and distributes data file 36 to the selected printer 16 with printer selection 44. As such, data file 36 is submitted to the selected printer via communication network 24. Accordingly, the selected printer, for example, printer 16b, can complete print job 14 based on print request 34 and data file 36.

Figure 10:
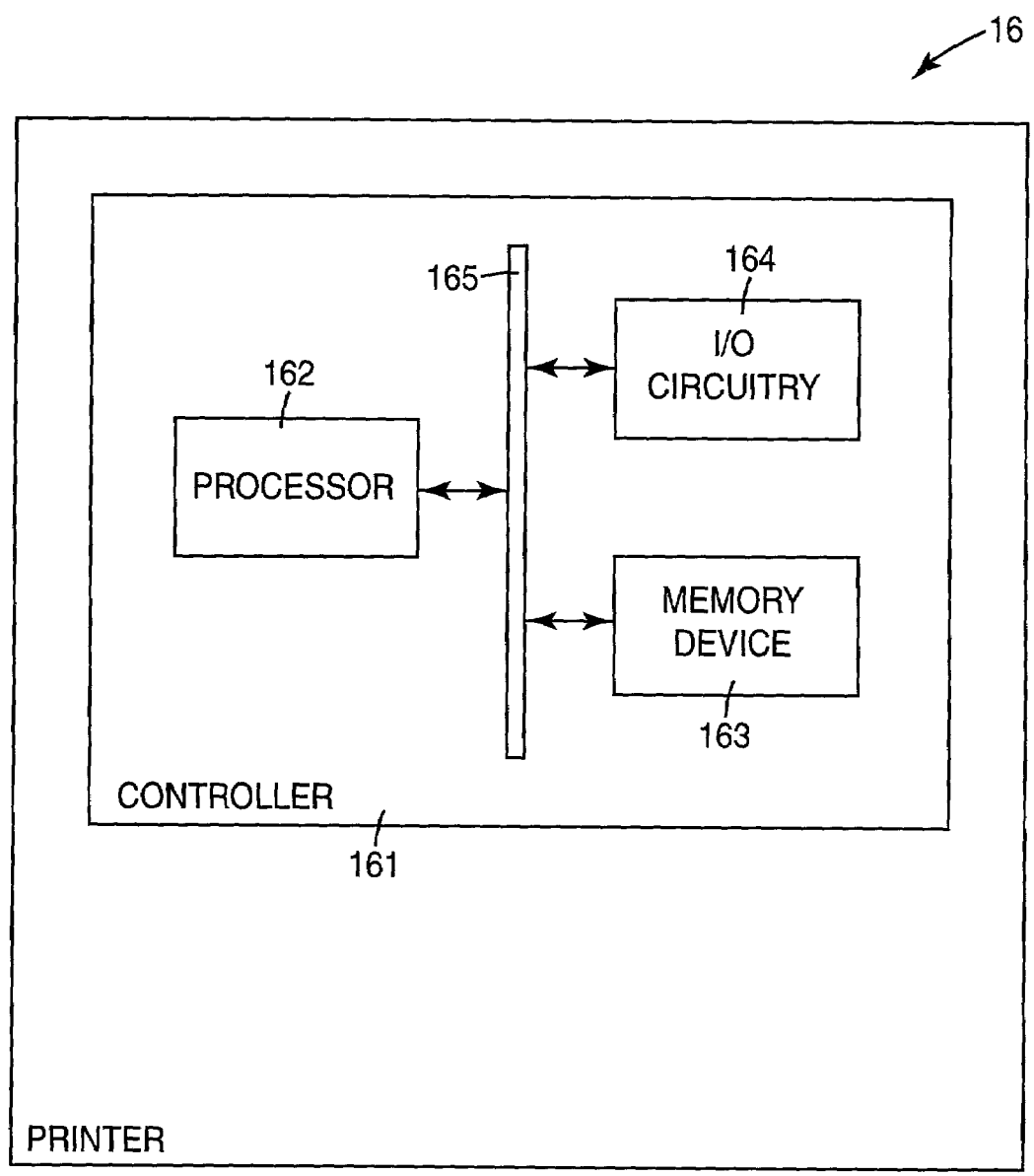
FIG. 10 is a schematic illustration of one exemplary embodiment of a printer according to the present invention.

As illustrated in FIG. 10, each printer 16 includes a printer controller 161 which processes commands and/or instructions for and controls operation of the respective printer 16. Printer controller 161 includes hardware, software, firmware, or a combination of these. In one preferred embodiment, printer controller 161 includes a processor 162, a memory device 163, and input/output (I/O) circuitry 164 all joined for communication via a communication bus 165. Processor 162 is capable of performing a sequence of logic operations and memory device 163 stores information for printer 16 including, for example, printing capability 26 of printer 16, as described above. Input/output circuitry 164 facilitates communication of data and/or commands to and from printer controller 161.

In one exemplary embodiment, printer controller 161 monitors printing capability 26 of printer 16 and processes print request 34 to determine whether printer 16 has the printing capability to fulfill print job 14. As such, processor 162 compares print request 34 of user 12 with printing capability 26 of printer 16 to determine if printer 16 has printing capability 26 to fulfill print job 14. Thus, if printer 16 has the printing capability to fulfill print job 14, printer controller 161 generates print offer 43 and submits print offer 43 to user 12 via communication network 24, as described above.

Figure 11:
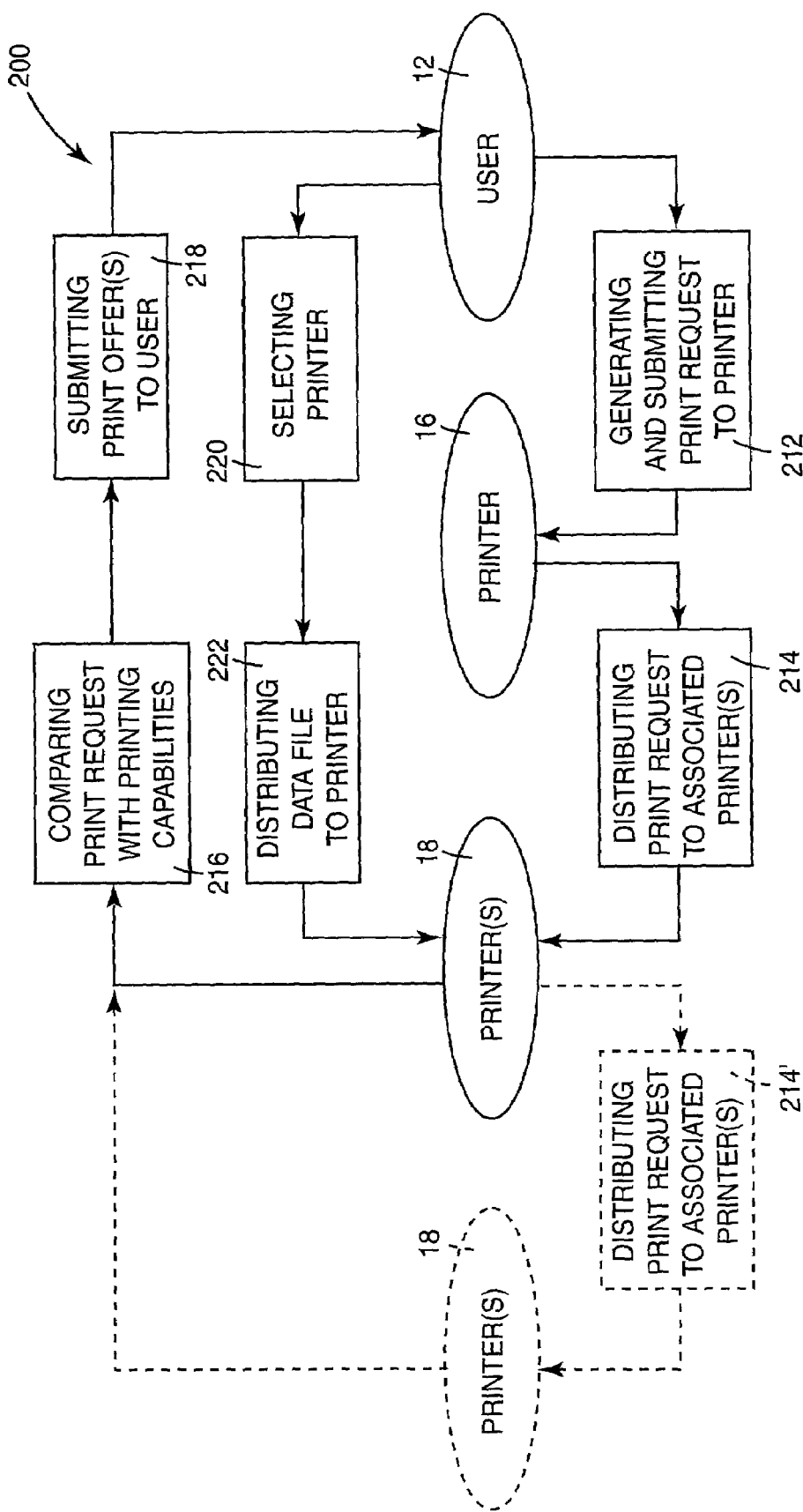
FIG. 11 is a flow diagram illustrating another exemplary embodiment of a method of selecting a printer from a plurality of printers for a print job according to the present invention.

In FIG. 11, a flow diagram illustrating another exemplary embodiment of a method of selecting a printer 16 from a plurality of printers 18 to fulfill print job 14 according to the present invention is illustrated generally at 200. Reference is also made to FIGS. 9 and 10. At step 212, user 12 generates and submits print request 34 for print job 14 to printer 16. In one exemplary embodiment, user 12 submits print request 34 to printer 16 via communication network 24, as illustrated in FIG. 9.

Next, in step 214, after printer 16 receives print request 34, printer 16 distributes print request 34 to associated printers. More specifically, printer 16 distributes print request 34 to printers with which printer 16 communicates. Preferably, printer 16 distributes print request 34 to one or more printers 18 via communication network 24, as described above.

In one exemplary embodiment, in step 214', one or more printers 18 distribute print request 34 to one or more associated printers 18. More specifically, as illustrated and described above with reference to FIG. 9, printers 18 distribute print request 34 to printers with which printers 18 communicate. As different prints are associated with different other printers, the number of printers to which print request 34 is distributed is increased.

Next, in step 216, after printers 18 receive print request 34, printers 18 each determine whether they have printing capability 26 to fulfill print job 14. As such, printers 18 each compare print request 34 for print job 14 with a respective printing capability 26. To compare print request 34 for print job 14 with printing capability 26, print request attributes 40 of print job 14, as specified by user 12, are compared with printing capability attributes 28 of printers 18, as monitored, for example, by printer controller 161 (FIG. 10). In one exemplary embodiment, printer controller 161 determines if printer 16 has the printing capability to fulfill print request 34 and, therefore, complete print job 14.

Next, in step 218, printers 18 having printing capability 26 to fulfill print request 34 submit print offer 43 to user 12. In one exemplary embodiment, print offer 43 is submitted to user 12 via communication network 24, as illustrated in FIG. 9.

Next, in step 220, user 12 selects at least one print offer 43 to complete print job 14. Thus, in one exemplary embodiment, user 12 submits printer selection 44 to the selected printer via communication network 24, as illustrated in FIG. 9.

Then, in step 222, data file 36 for print job 14 is distributed to the selected printer, as selected in step 220. Since printers 18 previously received print request 34 for print job 14 at step 214 or step 214', the selected printer can complete print job 14 based on print request 34 and data file 36 for print job 14.

In one exemplary embodiment, steps 212–222 of method 200 are performed via computer-executable instructions of a computer-readable medium. Computer-readable medium, as used herein, is defined to include any kind of computer memory such as a floppy disk, conventional hard disk, CD-ROM, Flash ROM, non-volatile ROM, RAM, etc.

By automatically distributing print request 34 to additional printers associated with an initial printer to which print request 34 is submitted, printer selection system 10' automatically increases a selection of available printers for printing print job 14. As such, user 12 need only submit print request 34 for print job 14 to a single printer. Thus, when selecting a printer for print job 14, it is not necessary for user 12 to know which printer 16 has the printing capability to fulfill print job 14. Furthermore, it is not necessary for user 12 to explore the capabilities of each printer to identify which printer can fulfill print job 14.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of selecting a printer from a plurality of printers to fulfill a print job of a user, the method comprising:

receiving a print request for the print job from the user at one of the printers;

after receiving the print request, the one of the printers automatically distributing the print request for the print job from the one of the printers to at least another of the printers associated with the one of the printers;

after distributing the print request, determining at the one of the printers and at the at least another of the printers, respectively, whether the one of the printers has a printing capability to fulfill the print job and whether the at least another of the printers has a printing capability to fulfill the print job, including comparing the print request for the print job with the printing capability of the one of the printers and the printing capability of the at least another of the printers; and submitting a print offer to the user from the one of the printers for the one of the printers to print the print job if the one of the printers has the printing capability to fulfill the print job and a print offer to the user from the at least another of the printers for the at least another of the printers to print the print job if the at least another of the printers has the printing capability to fulfill the print job.

2. The method of claim 1, further comprising:

linking the plurality of printers via a communication network, wherein distributing the print request for the print job includes distributing the print request for the print job to the at least another of the printers via the communication network.

3. The method of claim 1, further comprising:

further distributing the print request for the print job to at least a further one of the printers associated with the at least another of the printers associated with the one of the printers.

4. The method of claim 3, further comprising:

linking the plurality of printers via a communication network, wherein further distributing the print request for the print job includes further distributing the print request for the print job to the at least further one of the printers via the communication network.

5. The method of claim 1, further comprising:
linking the user and the plurality of printers via a communication network, wherein receiving the print request for the print job includes receiving the print request for the print job from the user at the one of the printers via the communication network.

6. The method of claim 5, wherein submitting the print offer to the user includes submitting the print offer to the user from the at least another of the printers via the communication network.

7. The method of claim 1, further comprising:
receiving a printer selection for the print job from the user at the at least another of the printers having the printing capability to fulfill the print job.

8. The method of claim 7, further comprising:
linking the user and the plurality of printers via a communication network, wherein receiving the printer selection for the print job includes receiving the printer selection for the print job from the user at the at least another of the printers having the printing capability to fulfill the print job via the communication network.

9. The method of claim 7, further comprising:
associating a data file for the print job with the printer selection for the print job; and
distributing the data file for the print job to the at least another of the printers having the printing capability to fulfill the print job.

10. The method of claim 9, further comprising:
linking the user and the plurality of printers via a communication network, wherein distributing the data file for the print job includes distributing the data file for the print job to the at least another of the printers having the printing capability to fulfill the print job via the communication network.

11. The method of claim 1, further comprising:
presenting to the user a user interface including at least one input field representing at least one option for the print job, wherein receiving the print request for the print job includes receiving at least one attribute for the print job as specified with the at least one input field of the user interface.

12. The method of claim 1, wherein receiving the print request for the print job includes specifying at least one of a number of copies, a print medium, a printing quality option, a printing layout, a color printing option, a finishing option, a printer location, a printing priority, an archive option, and a price for the print job.

13. A computer-readable medium having computer-executable instructions for performing a method of selecting a printer from a plurality of printers to fulfill a print job of a user, the method comprising:
receiving a print request for the print job from the user at one of the printers;
after receiving the print request, the one of the printers automatically distributing the print request for the print job from the one of the printers to at least another of the printers associated with the one of the printers;
after distributing the print request, determining at the one of the printers and at the at least another of the printers, respectively, whether the one of the printers has a printing capability to fulfill the print job and whether the at least another of the printers has a printing capability to fulfill the print job, including comparing the print request for the print job with the printing capability of the one of the printers and the printing capability of the at least another of the printers; and
submitting a print offer to the user from the one of the printers for the one of the printers to print the print job if the one of the printers has the printing capability to fulfill the print job and a print offer to the user from the at least another of the printers for the at least another of the printers to print the print job if the at least another of the printers has the printing capability to fulfill the print job.

14. The computer-readable medium of claim 13, the method further comprising:
further distributing the print request for the print job to at least a further one of the printers associated with the at least another of the printers associated with the one of the printers.

15. The computer-readable medium of claim 13, the method further comprising:
receiving a printer selection for the print job from the user at the at least another of the printers having the printing capability to fulfill the print job.

16. The computer-readable medium of claim 15, the method further comprising:
associating a data file for the print job with the printer selection for the print job; and
distributing the data file for the print job to the at least another of the printers having the printing capability to fulfill the print job.

17. A system for selecting a printer from a plurality of printers to fulfill a print job of a user, the system comprising:
a first controller associated with a first printer of the plurality of printers and adapted to receive a print request for the print job from the user and compare the print request for the print job with a printing capability of the first printer to determine if the first printer has the printing capability to fulfill the print job,
wherein the first controller is adapted to automatically distribute the print request for the print job from the first printer to at least a second printer of the plurality of printers, the second printer being associated with the first printer; and
a second controller associated with the second printer of the plurality of printers and adapted to receive the print request for the print job from the first printer and compare the print request for the print job with a printing capability of the second printer to determine if the second printer has the printing capability to fulfill the print job,
wherein the first controller is adapted to submit a first print offer to the user for the first printer to print the print job if the first printer has the printing capability to fulfill the print job, and the second controller is adapted to submit a second print offer to the user for the second printer to print the print job if the second printer has the printing capability to fulfill the print job.

18. The system of claim 17, further comprising:
a communication network configured to link the plurality of printers, wherein the first controller associated with the first printer is adapted to distribute the print request for the print job to the second printer via the communication network.

19. The system of claim 17, wherein the second controller associated with the second printer is adapted to further distribute the print request for the print job to at least a third printer of the plurality of printers, the third printer being associated with the second printer, and further comprising:

a third controller associated with the third printer of the plurality of printers and adapted to receive the print request for the print job from the second printer and compare the print request for the print job with a printing capability of the third printer to determine if the third printer has the printing capability to fulfill the print job, wherein the third controller is adapted to submit a third print offer to the user if the third printer has the printing capability to fulfill the print job.

20. The system of claim 19, further comprising:

a communication network configured to link the plurality of printers, wherein the second controller associated with the second printer is adapted to distribute the print request for the print job to the third printer via the communication network.

21. The system of claim 17, farther comprising:

a communication network configured to link the user and the plurality of printers, wherein the first controller is adapted to receive the print request for the print job from the user via the communication network.

22. The system of claim 21, wherein the second controller is adapted to submit the second print offer to the user via the communication network.

23. The system of claim 17, wherein the second controller is adapted to receive a printer selection for the print job from the user.

24. The system of claim 23, further comprising:

a communication network configured to link the user and the plurality of printers, wherein the second controller is adapted to receive the printer selection for the print job from the user via the communication network.

25. The system of claim 23, wherein the second controller is adapted to receive the printer selection and a data file for the print job from the user.

26. The system of claim 25, further comprising:

a communication network configured to link the user and the plurality of printer, wherein the second controller is adapted to receive the printer selection and the data file for the print job from the user via the communication network.

27. The system of claim 17, further comprising:

a user interface including at least one input field representing at least one option for the print job, wherein the at least one input field includes at least one of a number of copies, a print medium, a printing quality option, a printing layout, a color printing option, a finishing option, a printer location, a printing priority, an archive option, and a price field.

28. The system of claim 17, wherein the print request for the print job specifies at least one of a number of copies, a print medium, a printing quality option, a printing layout, a color printing option, a finishing option, a printer location, a printing priority, an archive option, and a price for the print job.

29. The system of claim 17, wherein the second controller includes a memory device configured to have the printing capability of the second printer stored therein and a processor associated with the memory device, wherein the processor is adapted to retrieve the printing capability of the second printer from the memory device and compare the print request for the print job with the printing capability of the second printer to determine if the second printer has the printing capability to fulfill the print job.

* * * * *

UNITED STATES PATENT AND TRADEMARK OFFICE
CERTIFICATE OF CORRECTION

PATENT NO. : 7,102,778 B2 Page 1 of 1
APPLICATION NO. : 10/044406
DATED : September 5, 2006
INVENTOR(S) : Travis Parry It is certified that error appears in the above-identified patent and that said Letters Patent is hereby corrected as shown below:

In column 15, line 17, in Claim 21, delete "farther" and insert -- further --, therefor.

In column 16, line 3, in Claim 26, after "plurality of" delete "printer," and insert -- printers, --, therefor.

Signed and Sealed this

Twenty-fifth Day of August, 2009

David J. Kappos
*Director of the United States Patent and Trademark Office*